United States Patent
Stamps et al.

(10) Patent No.: US 9,702,402 B2
(45) Date of Patent: Jul. 11, 2017

(54) INCREASED CAPACITY SPHERICAL LINED BEARINGS

(75) Inventors: Frank B. Stamps, Colleyville, TX (US); Bryan W. Marshall, Mansfield, TX (US)

(73) Assignee: Textron Innovations Inc., Providence, RI (US)

(*) Notice: Subject to any disclaimer, the term of this patent is extended or adjusted under 35 U.S.C. 154(b) by 778 days.

(21) Appl. No.: 13/283,973

(22) Filed: Oct. 28, 2011

(65) Prior Publication Data

US 2013/0108447 A1 May 2, 2013

(51) Int. Cl.
F01D 25/16 (2006.01)
F16C 23/04 (2006.01)
B64C 27/48 (2006.01)
B64C 27/82 (2006.01)

(52) U.S. Cl.
CPC ............ *F16C 23/043* (2013.01); *B64C 27/48* (2013.01); *B64C 27/82* (2013.01); *F16C 2326/43* (2013.01); *Y10T 29/49332* (2015.01)

(58) Field of Classification Search
CPC ......... B64C 27/00; B64C 27/54; B64C 27/48; B64C 27/82; F16C 23/043
USPC ....... 416/1, 106, 107, 134 A, 138, 140, 141, 416/244 R
See application file for complete search history.

(56) References Cited

U.S. PATENT DOCUMENTS

| | | | |
|---|---|---|---|
| 2,830,669 A * | 4/1958 | Klockner | 416/163 |
| 4,248,486 A * | 2/1981 | Bradley, Jr. | 384/206 |
| 4,986,735 A | 1/1991 | Robinson | |
| 6,520,682 B2 * | 2/2003 | Kletzli | A01B 59/008 384/192 |
| 6,764,280 B2 * | 7/2004 | Sehgal et al. | 416/104 |
| 7,568,841 B2 * | 8/2009 | Wood, Jr. | A01B 59/008 172/439 |
| 2002/0168122 A1 | 11/2002 | Kletzli | |
| 2008/0040886 A1 | 2/2008 | Arnold et al. | |

FOREIGN PATENT DOCUMENTS

| | | |
|---|---|---|
| EP | 0145819 A1 | 6/1985 |
| EP | 0456384 | 11/1991 |
| EP | 2154065 | 2/2010 |
| EP | 2154065 A1 | 2/2010 |

OTHER PUBLICATIONS

An Extended European Search Report from counterpart EP Application No. 11192202.7, issued by the European Patent Office on Feb. 16, 2012.
European Search Report dated Oct. 29, 2013 from counterpart EP App. No. 13183818.7.

(Continued)

*Primary Examiner* — Gregory Anderson
*Assistant Examiner* — Jason Fountain
(74) *Attorney, Agent, or Firm* — James E. Walton

(57) ABSTRACT

A rotary system and method to control feathering movement of a rotor blade. The system having a yoke arm configured to rotate a rotor blade. A first bearing and a second bearing are utilized to secure the rotor blade to the yoke arm and are configured to restrict longitudinal and transverse movement, while allowing feathering movement of the rotor blade relative to yoke arm.

12 Claims, 5 Drawing Sheets

(56) References Cited

OTHER PUBLICATIONS

Canadian Office Action for related Canadian Application No. 2,792,226, dated Oct. 11, 2013.
Office Action dated Aug. 29, 2014 from counterpart CN App. No. 201210385048X.
Third Office Office Action dated Oct. 28, 2015 from counterpart CN App. No. 201210385048X.
Office Action dated Apr. 14, 2015 from counterpart CN App. No. 201210385048X.

* cited by examiner

INCREASED CAPACITY SPHERICAL LINED BEARINGS

BACKGROUND

1. Field of the Invention

The present application relates generally to rotary systems, and more specifically, to a tail rotary system having spherical lined bearings.

2. Description of Related Art

Conventional tail rotors are well known in the art for effectively controlling yaw movement of a rotary aircraft. The tail rotor utilizes a plurality of rotor blades for creating thrust, and during flight, the rotor blades tend to feather, thereby creating an undesired movement that could cause the tail rotor to fail.

In some embodiments, conventional tail rotary systems include rotor blades that rigidly attach to the yoke arms. These embodiments are effective in restricting rotor blade feathering movement; however, the embodiments are prone to failure due to the blade feathering stresses exerted on the yoke arm.

Although great strides have been made in the field of tail rotary systems, many shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

Figure 1:
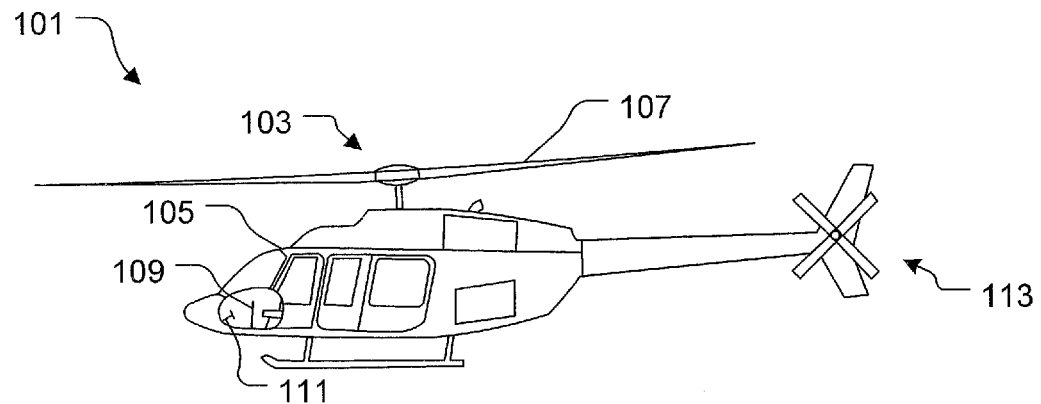
FIG. 1 is a side view of a rotary aircraft utilizing a rotary system of the present application.

While the system and method of the present application are susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The tail rotary system of the present application overcomes common disadvantages associated with conventional tail rotors by providing effective means for controlling feathering forces created by the rotor blades attached thereto during flight. Specifically, the tail rotor includes one or more bearings for securing the rotor blades to a yoke arm of a hub retention system. The bearings are aligned in a linear fashion so as to prevent longitudinal and transverse movement of the blade relative to the yoke arm, yet allowing feathering movement of the rotor blade. The bearings also include cutouts selectively positioned in the bearing housing for increasing feathering movement.

The tail rotary system of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that features, elements, and/or functions of one embodiment may be incorporated into another embodiment as appropriate, unless described otherwise.

Referring now to the drawings wherein like reference characters identify corresponding or similar elements throughout the several views, FIG. 1 is a side view of a rotary aircraft 101 utilizing the tail rotary system of the present application. Although depicted with the exemplary type of rotary aircraft 101, it will be appreciated that the features disclosed herein are easily adaptable for use with other types of rotary aircraft.

Rotary aircraft 101 comprises a main rotary system 103 positioned above fuselage 105 for rotating two or more rotor blades 107. The main rotary system 103 is controlled with a plurality of controllers carried within fuselage 105. During flight, the cyclic controller 109 and/or pedal 111 are manipulated to create vertical, horizontal, and yaw flight direction. Aircraft 101 is further provided with a tail rotor 113 that creates yaw movement during flight. A detailed description of tail rotor 113 is provided below.

Figure 2:
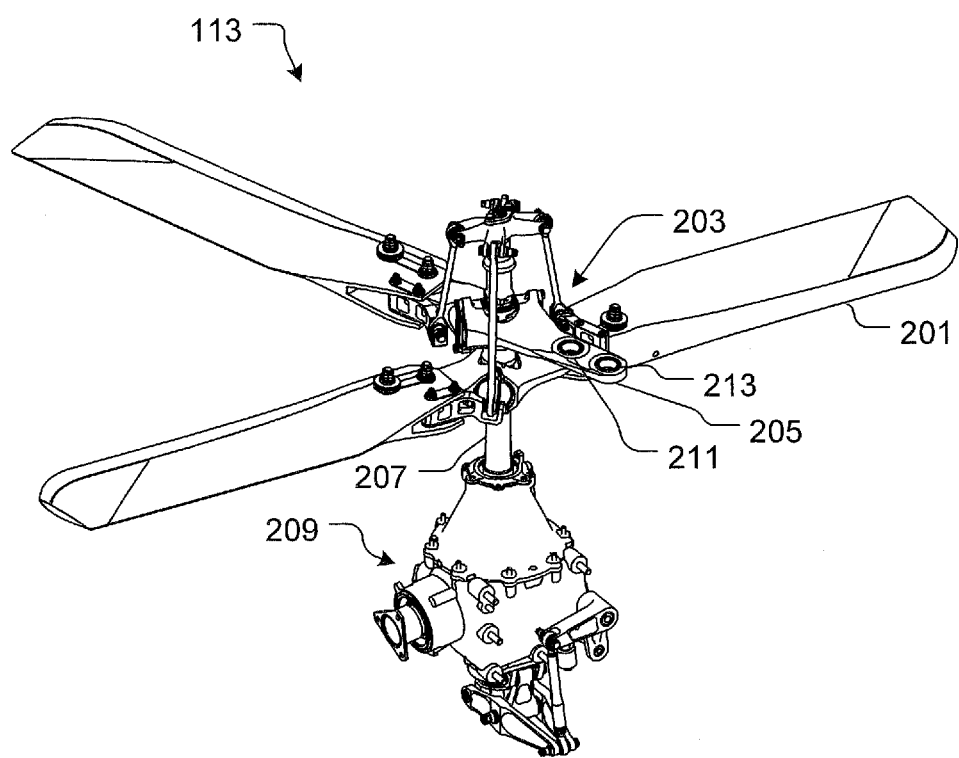
FIG. 2-3 are oblique views of a tail rotor of the rotary aircraft.
Figure 3:
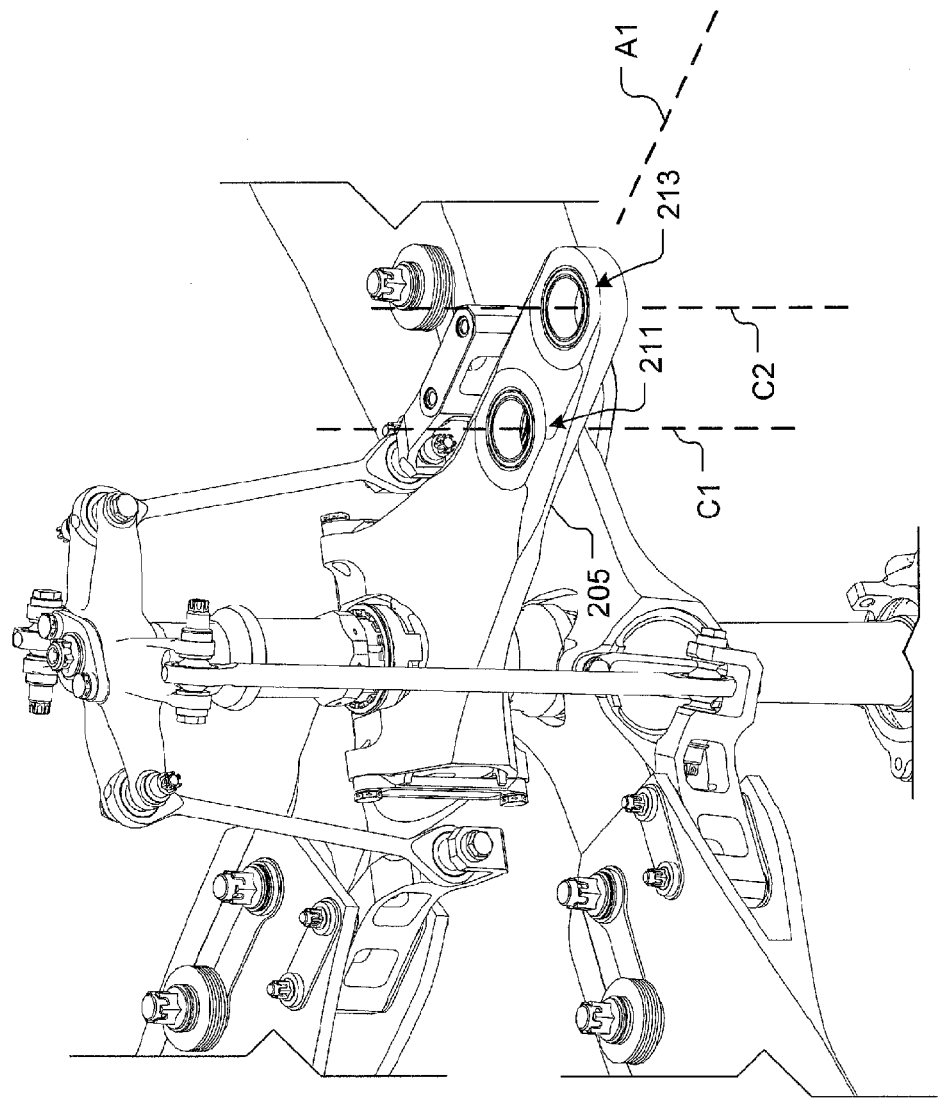

Turning next to FIGS. 2 and 3 in the drawings, oblique views of tail rotor 113 according to the preferred embodiment of the present application are shown. In the exemplary embodiment, tail rotor 113 includes four rotor blades 201; however, it will be appreciated that tail rotor 113 is easily adaptable for use with more of less blades in an alternative embodiment. It should be understood that for clarity, one of the four blades is removed to illustrate the bearings associated with the tail rotor. Blades 201 are configured to couple with a hub retention member 203 having four yoke arms 205, which in turn is rotatably attached to a mast 207 and an engine transmission 209.

Tail rotor 113 is further provided with two or more bearings: a first bearing 211 and a second bearing 213, both bearings being configured to allow slight feathering movement of the rotor relative to the yoke arm. In the preferred embodiment, bearings 211 and 213 are spherical bearings that sit flush with an upper surface and a lower surface of yoke arm 205; however, it will be appreciated that other types of bearings and devices could be used in lieu of the preferred embodiment. As is described more fully below, the spherical bearings allow for slight feathering motion of the rotor blades, which provides significant advantageous over conventional tail rotors, namely tail rotors having rotor blades rigidly attached to the yoke arm.

Referring specifically to FIG. 3, yoke arm 205 has length extending along a longitudinal axis A1 and both bearings 211 and 213 have centerlines C1 and C2, respectively, that are aligned in a linear fashion such that both centerlines C1 and C2 intersect with the longitudinal axis A1 of yoke arm 205.

Figure 4:
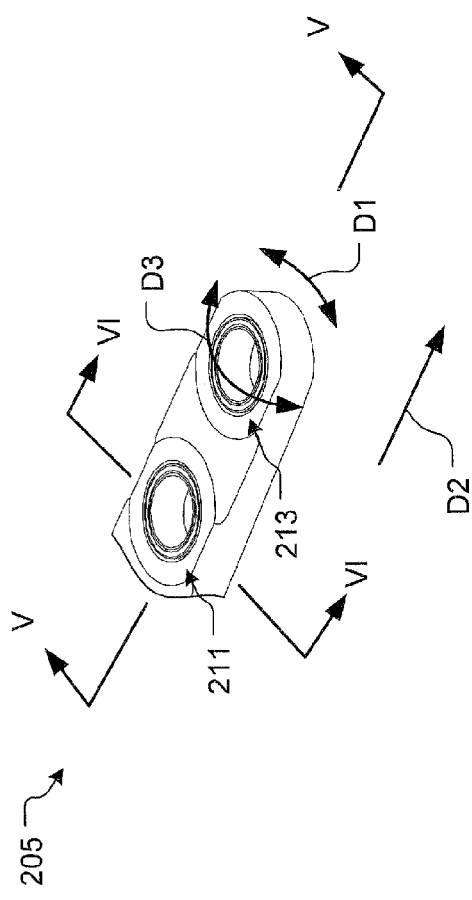
FIG. 4 is a partial oblique view of a yoke arm of the tail rotor of FIG. 2.

In FIG. 4, a partial oblique view of yoke arm 205 is shown. FIG. 4 provides further illustration of the bearings according to the preferred embodiment of the present application. Tail rotor 113 preferably includes two bearings for securing the rotor blade to the yoke arm; however, it will be appreciated that alternative embodiments could include additional bearings in lieu of the preferred embodiment. The two bearing configuration provides means for restricting transverse movement of the rotor blades in direction D1 and longitudinal movement in direction D2; however, the bearings are configured to allow slight feathering movement of the rotor blades in direction D3 during flight. These features are achieved due to the alignment of the bearings relative to the yoke arm longitudinal axis A1, as described above.

Figure 5:
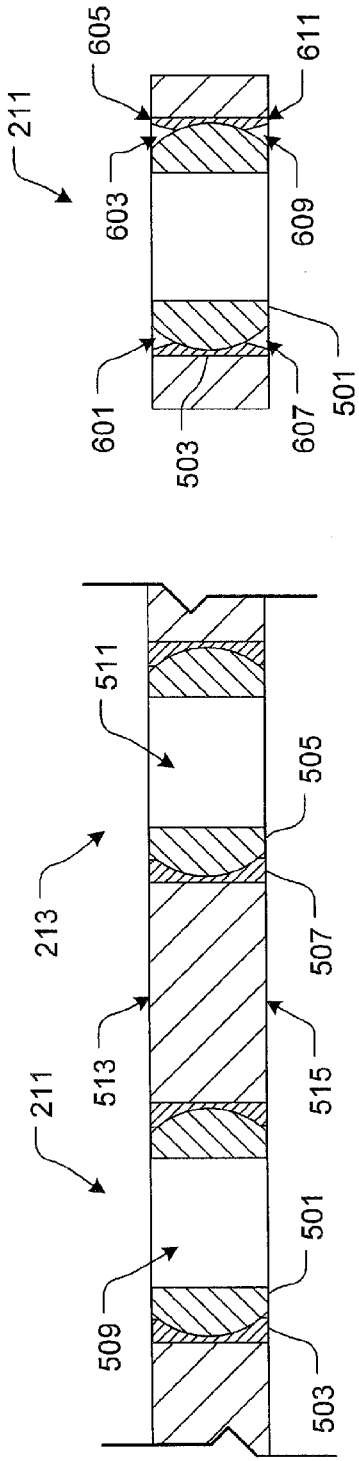
FIG. 5 is a cross-sectional view of the yoke arm of FIG. 4 taken at V-V.

In FIG. 5, a cross-sectional view of yoke arm 205 is shown taken at V-V of FIG. 4. In the preferred embodiment, both bearings 211 and 213 are spherical bearings, which allow pivoting movement in direction D3 to compensate for feathering. Bearing 211 comprises of a spherical ball 501 rotatably engaged with a housing 503, and likewise, bearing 213 comprises a spherical ball 505 rotatably engaged with a housing 507. Both bearings 211 and 213 include passages 509 and 511, respectively, as means for securing the blade thereto. In the preferred embodiment, housing 503 extends the entire thickness length of yoke arm 205, specifically, from a top surface 513 to a bottom surface 515. This feature increases the contact surface area between housing 503 and spherical ball 501.

Figure 6:
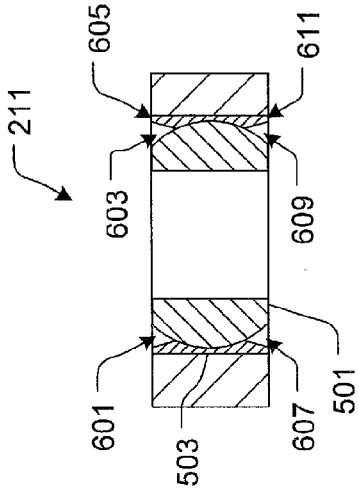
FIG. 6 is a cross-sectional view of the yoke arm of FIG. 4 taken at VI-VI.

FIG. 6 is a cross-sectional view of yoke arm 205 taken at VI-VI of FIG. 4. Bearing 211 is further provided with four cutouts extending from the top and bottom surfaces of housing and inwardly into housing 503. The cutouts are preferably contoured to match the outer contouring of the attachment means received by passage 509. It should be understood that the cutouts allow additional feathering movement of the rotor blades in direction D3, which in turn greatly increases the efficiency of bearing 211. As is shown, bearing 211 preferably comprises four cutouts: a first cutout 601 and a second cutout 603 extending from a top surface 605 of housing 503, and a third cutout 607 and a fourth cutout 609 extending from a bottom surface 611 of housing 503.

Figure 7:
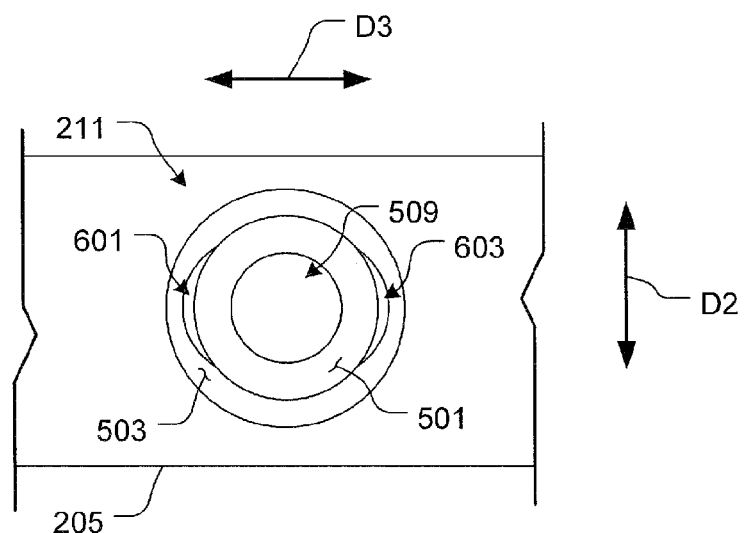
FIG. 7 is a top view of a spherical bearing of FIG. 4.

In FIG. 7, a top view of bearing 211 is depicted. FIG. 7 further illustrates the contouring of cutouts 601 and 603. In the preferred embodiment, cutouts 601 and 603 have a generally circular contouring to match the contouring of the attachment means, i.e., a circular shaft. However, it will be appreciated that cutouts 601 and 603 could easily be manufactured with different geometric contouring in alternative embodiments. It should be understood that the cutouts are selectively machined on outer housing 503 to allow additional pivoting movement of spherical ball 501 in direction D3 (feathering movement), but not in direction D2. It should be appreciated that the combination of bearings 211 and 213 are utilized in conjunction with each other to prevent movement in directions D1 and D2, while allowing pivoting movement in direction D3. The cutouts are utilized to increase pivoting movement of the rotor blades during flight.

Figures 8A, 8B:
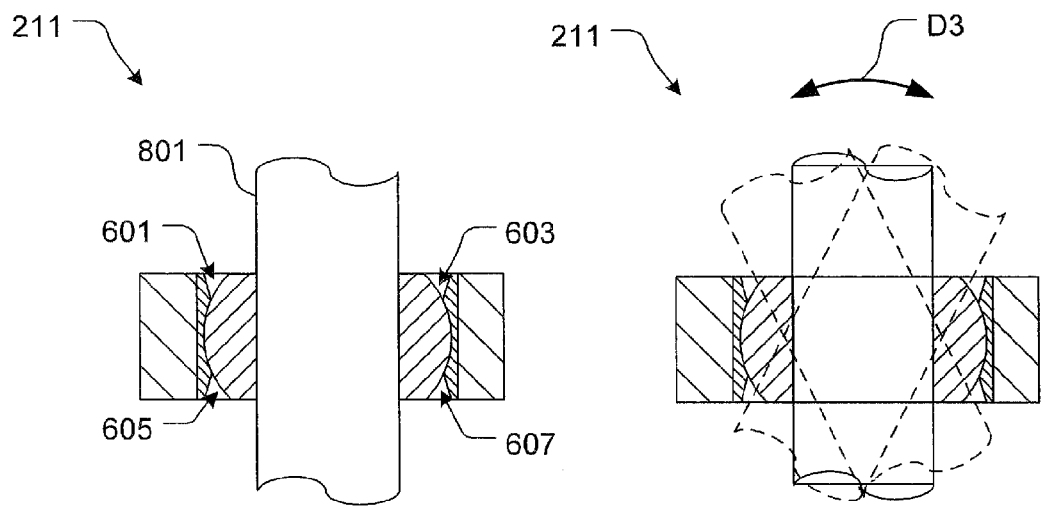
FIGS. 8A and 8B are cross-sectional views of the spherical bearing of FIG. 6 shown operably associated with a mast.

In FIGS. 8A and 8B, the bearings are shown operably associated with an attachment means 801, which in the preferred embodiment, is a shaft that extends through passage 509. Attachment means 801 could include a liner placed between the spherical ball 501 and attachment means 801 for providing protection and support. As is depicted in FIG. 8B, phantom lines of attachment means 801 show feathering movement of the rotor blade relative to the yoke arm. It should be understood that attachment means 801 does not come into contact with housing 503.

Figure 9:
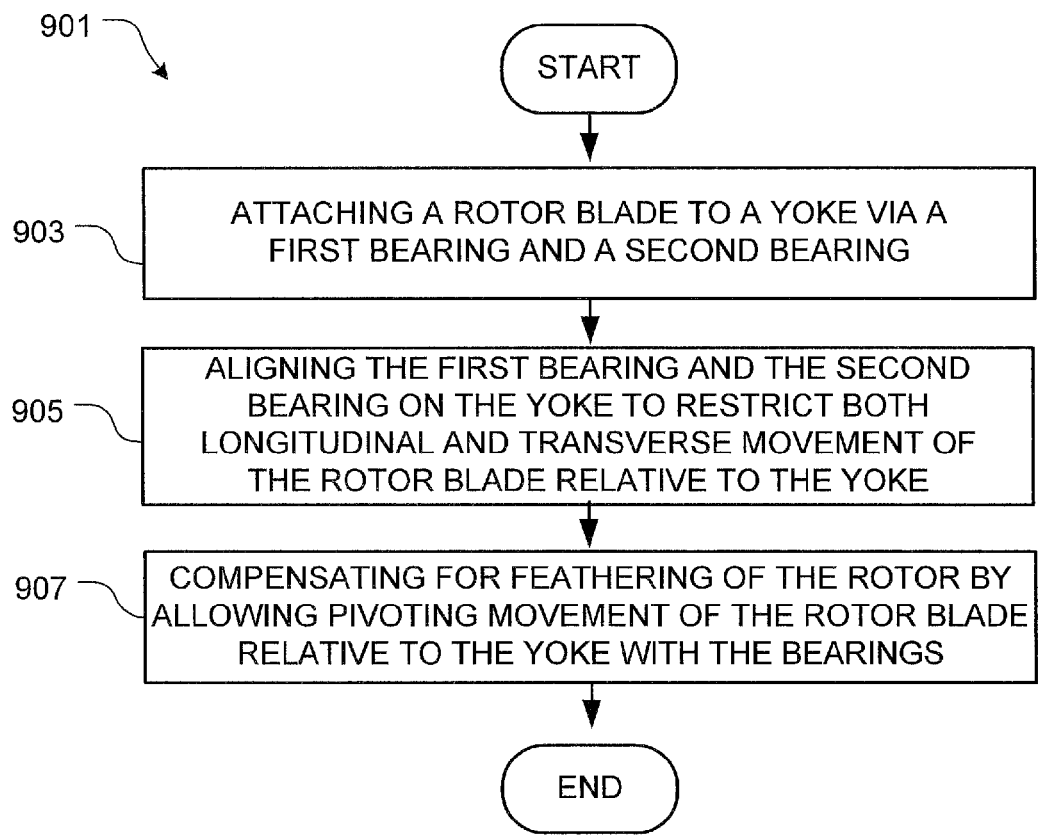
FIG. 9 is a flow chart depicting the preferred method.

Referring next to FIG. 9, a flow chart 901 depicting the preferred process is shown. Box 903 shows the first step, which includes attaching a rotor blade to a yoke arm via a first bearing and a second bearing. The next step includes aligning the first bearing and the second bearing on the yoke arm to restrict both longitudinal and transverse movement of the rotor blade relative to the yoke arm, as depicted in box 905. Finally, box 907 shows the last step, which includes allowing pivoting movement of the rotor blade relative with yoke arm to compensate for feathering during flight.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rotary system, comprising:
    a yoke arm having an upper surface and a lower surface;
    a rotor blade;
    a first bearing carried by the yoke arm and configured to pivotally secure the rotor blade to the yoke arm and to allow feathering movement of the rotor blade relative to the yoke arm during flight, the first bearing comprising: a housing, having:
    a first cutout and a second cutout extending inwardly in the housing and from a top surface of the housing;
    a third cutout and a fourth cutout extending inwardly in the housing and from a bottom surface of the housing;
    wherein the first, second, third, and fourth cutouts are each discrete;
    a spherical ball rotatably carried within the housing and having a thickness that does not extend beyond the upper and lower surfaces of the yoke arm; and
    a passage extending through the spherical ball and configured to couple with a first attachment means associated with the rotor blade configured to secure the rotor blade to the yoke arm;
    wherein the first cutout is positioned directly above the third cutout and the second cutout is positioned directly above the fourth cutout;

wherein the first cutout and the fourth cutout allow the first attachment means to pivot only in a first feathering direction; and wherein the second cutout and the third cutout allow the first attachment means to pivot only in a second feathering direction; and a second bearing carried by the yoke arm and configured to pivotally secure the rotor blade to the yoke arm and to allow feathering movement of the rotor blade relative to the yoke arm during flight.

2. The system of claim 1, wherein the rotary system is a tail rotor.

3. The system of claim 1, wherein the first bearing is a spherical bearing.

4. The system of claim 1, wherein the first cutout has an inner surface area contoured to match an outer surface contouring of the first attachment means.

5. The system of claim 1, furthering comprising:
a yoke arm thickness extending from a top surface of the yoke arm to a bottom surface of the yoke arm;
wherein the first bearing is disposed within the yoke arm.

6. The system of claim 5, wherein the housing extends the entire thickness length of the yoke arm.

7. The system of claim 1, wherein the yoke arm has a longitudinal axis, the first bearing has a first centerline, and the second bearing has a second centerline; and
wherein the first centerline and the second centerline are aligned with the longitudinal axis of the yoke arm.

8. The system of claim 7, wherein the first bearing and the second bearing are configured to allow feathering movement of the rotor blade relative to the longitudinal axis, while restricting transverse and longitudinal movement of the rotor blade relative to the longitudinal axis.

9. The system of claim 1, the second bearing comprising:
a housing;
a spherical ball rotatably carried within the housing; and
a passage extending through the spherical ball and configured to couple with a second attachment means associated with the rotor blade configured to the rotor blade to the yoke arm.

10. The system of claim 9, further comprising:
a first cutout and a second cutout extending inwardly in the housing and from a top surface of the housing; and
a third cutout and a fourth cutout extending inwardly in the housing and from a bottom surface of the housing;
wherein the first cutout is positioned directly above the third cutout and the second cutout is positioned directly above the fourth cutout;
wherein the first cutout and the fourth cutout allow the second attachment means to pivot in a first feathering direction; and
wherein the second cutout and the third cutout allow the second attachment means to pivot in a second feathering direction.

11. A tail rotor, comprising:
a yoke arm configured to rotate a rotor blade; and
a first bearing and a second bearing, both the first bearing and the second bearing being carried by the yoke arm and configured to secure the rotor blade to the yoke arm and to allow feathering movement of the rotor blade relative to the yoke arm during flight, the first bearing comprising: a housing, having:
a first cutout and a second cutout extending inwardly in the housing and from a top surface of the housing;
a third cutout and a fourth cutout extending inwardly in the housing and from a bottom surface of the housing;
wherein the first, second, third, and fourth cutouts are each discrete;
a spherical ball rotatably carried within the housing, the spherical ball having a thickness that is not greater than a thickness of the housing; and
a passage extending through the spherical ball and configured to couple with a first attachment means associated with the rotor blade configured to secure the rotor blade to the yoke arm;
wherein the first cutout is positioned directly above the third cutout and the second cutout is positioned directly above the fourth cutout;
wherein the first cutout and the fourth cutout allow the first attachment means to pivot only in a first feathering direction; and
wherein the second cutout and the third cutout allow the first attachment means to pivot only in a second feathering direction; wherein the first bearing and the second bearing are aligned in a linear fashion so as to restrict transverse and longitudinal movement of the rotor relative to the yoke arm.

12. The tail rotor of claim 11, wherein the yoke arm has a longitudinal axis, the first bearing has a first centerline, and the second bearing has a second centerline; and
wherein the first centerline and the second centerline are aligned with the longitudinal axis of the yoke arm.

* * * * *